UNITED STATES PATENT OFFICE.

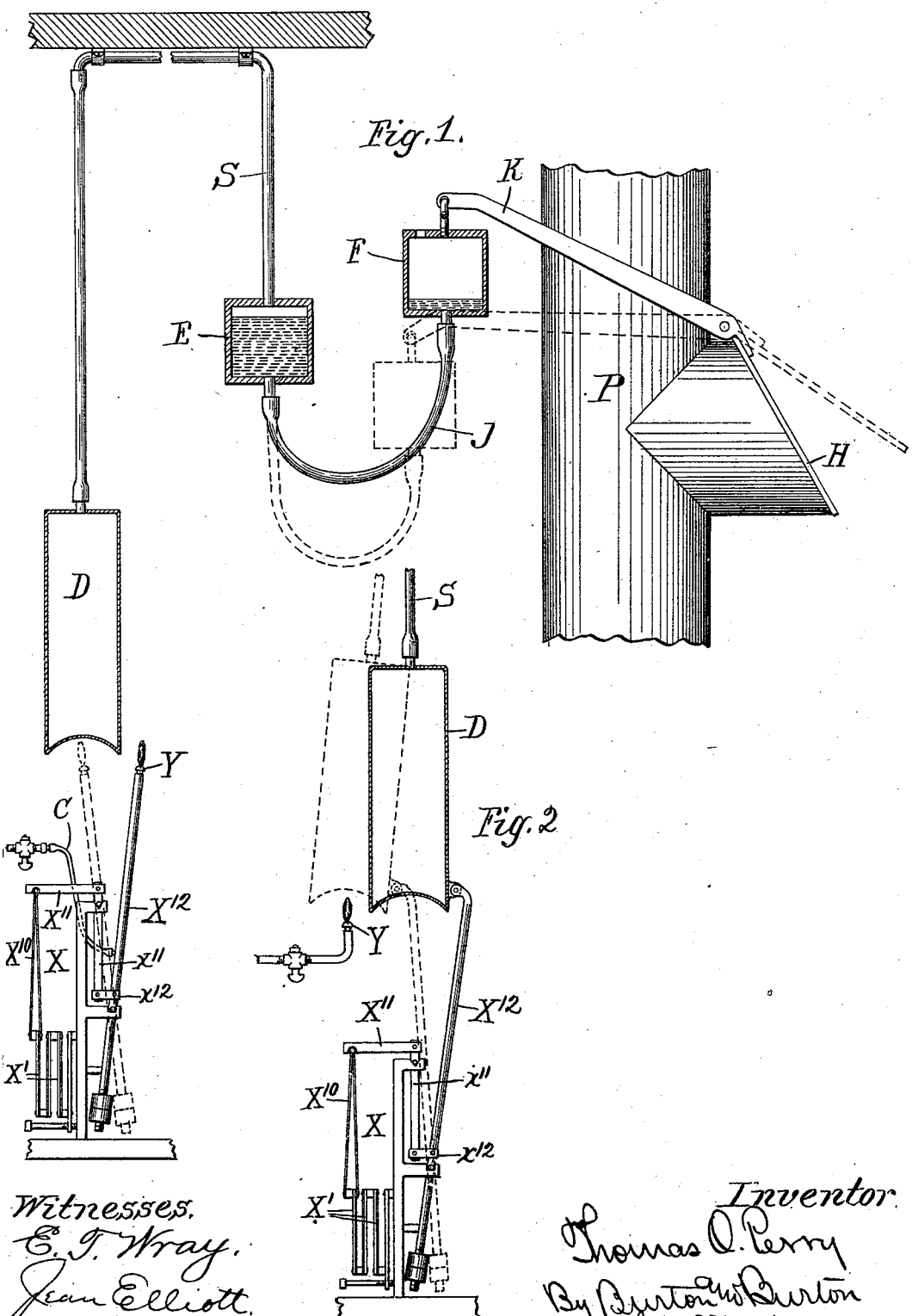

THOMAS O. PERRY, OF CHICAGO, ILLINOIS.

TEMPERATURE-REGULATOR.

SPECIFICATION forming part of Letters Patent No. 528,800, dated November 6, 1894.

Application filed January 9, 1894. Serial No. 496,270. (No model.)

*To all whom it may concern:*

Be it known that I, THOMAS O. PERRY, a citizen of the United States, residing at Chicago, county of Cook, and State of Illinois, have invented certain new and useful Improvements in Temperature-Regulators, which are fully set forth in the following specification, reference being had to the accompanying drawings, forming a part thereof.

This invention relates to devices for regulating the temperature of apartments by means of control of the draft devices of the heating apparatus or ventilating devices of the apartment, and it involves the employment of a thermostatic device exposed to the temperature of the apartment which is to be regulated and an element which expands and contracts with the changes of temperature, and which is connected to a valve or damper which regulates the ventilation of the apartment or the draft of the heating device, and a constant heating device, as a small gas jet or candle whose position with respect to the expanding and contracting element is controlled by the thermostatic device mentioned, so that a slight change of temperature of the apartment will cause the expanding and contracting element to be exposed or relieved of exposure to the heating device, so that a much greater change of temperature of the expanding and contracting element will be produced and the effect of the slight change of temperature in the apartment thereby greatly multiplied to cause the expanding or contracting element to operate the valve or damper sufficiently to regulate the temperature.

In my pending applications, Serial No. 476,160, filed May 31, 1893, Serial Nos. 486,988 and 486,989, filed October 2, 1893, and No. 490,092, filed November 6, 1893, I have shown specific devices for accomplishing the same ultimate result, but those devices all involve the employment of some form or other of device for conducting or guiding the heat current against or away from the expanding and contracting element.

The present invention consists specifically in the combination of an expanding and contracting element with a constantly heating device, the relative position of the two being changed to cause the heat of the heating device to affect or not to affect the expanding and contracting element.

In the drawings:—Figure 1 is a view of the nature of a diagram which is sectional with respect to the specific devices involving the invention in question, showing my improved regulator connected to a valve or damper which may be considered as either the check damper of a heater or of a ventilating flue connected to the apartment to be regulated, section being made vertically through a chamber which contains the expanding and contracting element, and a chamber connected therewith, the thermostatic device and heating device and their connections being shown in elevation. Fig. 2 shows a modification of the form of the device from that shown in Fig. 1, the thermostatic device being connected to the chamber which contains or constitutes the expanding or contracting element, instead of to the heating device.

P is a ventilating flue from the room in which the temperature is to be regulated, or a draft pipe or flue from the heater which heats such room.

H is the check damper or valve which admits air to the flue, thereby either ventilating the apartment or checking the fire in the heater. K is the lever arm of such damper.

F is a vessel containing water, suspended from the free end of the arm K, and connected at the bottom by a flexible tube J with the bottom of the fixed vessel E, which contains water or other liquid, and which has connection from the top by the pipe S with the interior of the air chamber D, which may conveniently be suspended by that pipe connection from the ceiling of the room, or from the fixed vessel E, the chamber D being made of thin metal,—preferably copper or other metal,—which may be quickly heated and cooled. Rise of temperature of the chamber D causing its contents to be expanded forces the water out of the vessel E into the vessel F, and eventually tends by the weight of the water thus added, to counterbalance the damper H, and cause it to be opened. The cooling of the chamber D reversing the process, and permitting the water to flow out of the chamber F into the chamber E, permits the damper to close. This structure and mode of operation are the same as those set forth in my above-mentioned application, Serial No. 476,160, filed May 31, 1893.

X represents a thermostatic device which is more particularly described in my above-mentioned application, Serial No. 486,988, filed October 2, 1893, but which may here be described briefly as comprising compound plates $X'$ adapted to be flexed by change of temperature, and so connected that their flexure is accumulated and produces a movement of the lever arm $X^{10}$ attached to the outermost plate, which, through the link $X^{11}$, lever $x^{11}$ and link $x^{12}$ operates the lever $X^{12}$, which is poised so as to be normally approximately vertical and to be easily tilted away from such vertical position in either direction by the action of the thermostatic plates connected to it as described. The lever $X^{12}$, as to its upper part, at least, is tubular, and carries at the upper end a gas tip or burner Y.

C is a flexible tube connected to the tubular arm $X^{12}$, near the pivot of the latter, and extending to a source of gas supply.

The gas burner and the connection by which the gas is supplied is simply a convenient and quite desirable form of heating device, but any heating device, as a candle, may be understood as represented by the letter Y, the heating device being carried upon the lever arm $X^{12}$ in the position in which the gas jet is shown. As the lever $X^{12}$ swings on its pivot, actuated by the thermostat as described, the heating device which said lever carries, is moved from a position under the chamber D to a position out from under it. In the first position, the chamber D is heated and its contents expanded, with the result above described of opening the damper. In the second position,—out from under the chamber,—the latter cools with the reverse effect. The heating effect of the heating device upon the chamber D may be rendered greatest by making the bottom of that chamber downwardly concave as shown in the drawings, thus gathering the hot current from the flame and holding it somewhat longer against the bottom of the chamber. Other obvious expedients may be resorted to to increase and confine the effect of the heat upon the chamber, but such expedients are not vital to this invention.

The several devices will be so connected and set that when the compartment to be regulated is at the desired temperature, the heating device is out from under the chamber D, and so that change of temperature in excess of what it is desired to permit, will cause the heating device to be shifted to a position under the chamber. Instead of having the heating device carried on the lever $X^{12}$, it may be fixed in position, as shown in Fig. 2, and the lever may be connected directly to the chamber D, the latter being suspended by the flexible pipe which connects it with the chamber E, so that it may be swung easily from the position at which it is not over the heating device to a position at which it is over the heating device. Under the same conditions as in the first form the heating device is carried from a position where it is not under the chamber to a position where it is under it. The purpose in both forms is the same,—to-wit, to deprive the chamber of the heat or to expose it to it according as the temperature of the apartment in which the thermostat is located is or is not higher than desired.

I have shown the particular form of expanding and contracting element herein described and illustrated, and the sort of connections from it to the damper which are shown, not because my invention is in any manner limited to the use of such devices, but because they are, in view of my former applications, familiar, and are effective. It will be understood that the character of these elements is not material to the matter of the present invention, which is concerned only with the relative position of the expanding and contracting element, wherever it may be, and the constant heating device, and means for exposing the one to the other. Some forms of the expanding and contracting element may be more effective if the flame of the heating device is brought into actual contact with them and moved from such contact by the two movements which the heating and cooling of the thermostat produce.

I claim—

1. In a temperature regulator, in combination with a regulating valve or damper, an expanding and contracting element and connections therefrom by which its expansion and contraction may operate the damper; a constant heating device; a thermostatic device exposed to the temperature to be regulated, and mechanism by which it controls the relative position of the expanding and contracting element and the constant heating device: substantially as set forth.

2. In a temperature regulator, in combination with the regulating valve or damper, an expanding and contracting element, and connections therefrom by which its expansion and contraction may operate the damper; a constant heating device; a thermostatic device exposed to the temperature to be regulated, and connections therefrom to the constant heating device adapted to move the latter to and from a position in which its heat is directed against the expanding and contracting element: substantially as set forth.

3. In a temperature regulator, in combination with the regulating valve or damper, an expanding and contracting element and connections therefrom by which its expansion and contraction may operate the damper; a constant heating device; a thermostatic device exposed to the temperature to be regulated, and mechanism by which it controls the relative position of the expanding and contracting element and the constant heating device; the expanding and contracting element being concave downward toward the heating device: substantially as set forth.

In testimony whereof I have set my hand, at Chicago, Illinois, December 22, 1893.

THOMAS O. PERRY.

Witnesses:
CHAS. S. BURTON,
JEAN ELLIOTT.